(12) United States Patent
Park (10) Patent No.: US 6,698,337 B1
(45) Date of Patent: Mar. 2, 2004

(54) AIR CORE COOKWARE

(76) Inventor: Jong Peter Park, 1630 Summitridge Dr., Diamond Bar, CA (US) 91765

( * ) Notice: Subject to any disclaimer, the term of this patent is extended or adjusted under 35 U.S.C. 154(b) by 0 days.

(21) Appl. No.: 10/237,288

(22) Filed: Sep. 9, 2002

(51) Int. Cl.[7] .............................. A23L 1/00; A47J 27/00; A47J 27/06; A47J 37/00; H05B 1/02
(52) U.S. Cl. ........................................................ 99/342
(58) Field of Search .................. 99/333, 337, 338, 99/342–344, 403–418, 444–450, 339, 340, 483; 126/369, 373.1, 377.1; 219/492, 494, 497, 41, 501; 220/592, 246, 315, 393, 486, 489, 314, 316, 912; 426/509–511, 520, 523

(56) References Cited

U.S. PATENT DOCUMENTS

| | | | | | |
|---|---|---|---|---|---|
| 899,244 | A | * | 9/1908 | Chase | 99/412 |
| 1,214,992 | A | * | 2/1917 | Boleratz | 99/412 |
| RE16,011 | E | * | 3/1925 | Simon | 99/412 |
| 2,081,751 | A | * | 5/1937 | Lendrum et al. | 99/412 |
| 3,808,963 | A | * | 5/1974 | Ludena | 99/417 |
| 4,164,174 | A | * | 8/1979 | Wallsten | 99/415 |
| 4,401,017 | A | * | 8/1983 | Feld | 99/413 |
| 4,462,308 | A | * | 7/1984 | Wang | 99/403 |
| 4,604,989 | A | * | 8/1986 | Kita | 99/342 X |
| 4,739,698 | A | * | 4/1988 | Allaire | 99/417 |
| 5,287,798 | A | * | 2/1994 | Tkaeda | 99/413 |
| 5,584,235 | A | * | 12/1996 | DuBois et al. | 126/369 X |
| 5,816,139 | A | * | 10/1998 | Scorta Paci | 99/410 X |

* cited by examiner

*Primary Examiner*—Timothy F. Simone (57) ABSTRACT

An Air Core™ cooking vessel has an outer shell, an inner shell disposed inside the outer shell forming an inner space between the outer and inner shells. The inner space formed between the outer and inner shells by interlocking the outer edges of the top flange of the inner shell to outer edges of the bottom flange of the outer shell preserves heat and traps moisture during cooking.

14 Claims, 7 Drawing Sheets

AIR CORE COOKWARE

BACKGROUND OF THE INVENTION

1. Field of the Invention

The present invention relates to an Air Core™ cooking vessel, specifically, to a cooking vessel having a double-layered structure that preserves heat and traps moisture during cooking.

2. Description of the Related Art

Various types of cooking vessel are known and used in a kitchen. Such cooking vessel is made of one or more layers of stainless steel and has a single-layered bottom. The single layered bottom is good for directly transmitting heat to the food contained in the vessel, but also causes burning of the food when carefully not attended to.

To solve the above problems, a cooking vessel having a double-layered structure has been proposed for preventing burnt food and to improve food flavor. One such ideas is published in Korean Utility Laid-Open Publication No. 85-7307, which teaches that paraffin is injected between a space provided by a double-layered structure and an air hole is established thereon.

Moreover, a pot of a double-layered structure and a pot having a double-layered structure into which a working fluid is injected are taught by Japanese Laid-Open Publication No. 56-169825.

Instead of charging the space with paraffin, a structure into which a fluid of heat-medium is injected and sealed is disclosed in Korean Laid-Open Publication No. 97-4035.

In such pots having the above-mentioned structures of the related arts, the gap between the double-layer are filled with heat media to provide even-heat distribution and to save heat energy. Unfortunately, the structures of the related arts are filled with the heat medium substances and have to be sealed to prevent the substances from leaking out, resulting in the difficulties in manufacturing the cookware.

SUMMARY OF THE INVENTION

Accordingly, the present invention is directed to a cooking vessel that substantially obviates one, or more of the problems due to limitations and disadvantages of the related art.

The object of the present invention is to provide a cooking vessel having a double-layered structure, which provide even heat distribution and preserves heat for a longer period of time.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a cooking vessel comprises an inner shell having an open region having a bottom surface which extends upwardly to terminate at a top flange, a portion of the top flange forming an inner rim and an outer rim, the inner rim having a radius less than the radius of the outer rim, the outer rim formed substantially above the inner rim; an outer shell having an open region having a bottom surface which extends upwardly to terminate at an outwardly projecting bottom flange, the bottom flange having a length less than the length of the top flange; an inner space formed in an area between the inner shell and the outer shell and at least partially contains a heat conduction medium, the inner space formed by disposing the inner shell into the open region of the outer shell, wherein outer edges of the top flange is interlocked to outer edges of the bottom flange and substantially flattened to hermetically seal the inner space.

According to one aspect of the present invention, the wall space between the outer and inner shells contains air as its primary heat conduction medium. Alternatively, the wall space defined by the outer and inner shells contains a chemical, such as silicon oil, as its primary heat conduction medium.

According to another aspect of the present invention, a heat transfer plate is affixed to and in contact with an outer bottom surface of the outer shell. Preferably, the heat-transfer plate is bonded to the base of the vessel by high impact. By bonding the plate by high impact, the vessel is more durable than if it was affixed by a brazing method because water that can cause rust and damage the cooking vessel is kept out of the area where the heat transfer plate is affixed.

In addition, the cooking vessel comprises an inner lid adapted to cover an open region of the inner shell and a portion of the inner rim. The inner lid comprises a disk having a diameter sufficiently large to cover the opening of the inner shell, and a ring having a flange coupled to the disk and circumferentially covering outer edges of the disk. The disk is preferably made of tempered glass but could also be made of stainless steel, aluminum and aluminum alloy.

The inner rim can also be shaped in a groove-like manner to fit the ring attached to the outer edges of the disk and to trap moisture. When moisture evaporates from cooking, the groove-like inner rim collects a pocket of moisture. The collected moisture acts as a seal, preventing additional moisture and heat from leaving the open region of the inner shell where the food is being cooked.

The flange formed on the bottom portion of the ring slides downward into the open region of the inner shell, and it is another means of ensuring that moisture and heat stay inside the cooking vessel.

Additionally, the cooking vessel comprises an outer lid that fits over the outer rim of the inner shell and the inner lid. The outer and the inner lid define an air gap space therebetween for trapping heat. The air gap, like the inner space, is a way of trapping heat and moisture, and distributing heat evenly and optimally.

Preferably, a means gauging temperature is installed on the outer lid. More preferably, the temperature gauge is affixed on the protruding knob. The temperature gauge informs the user when to turn off the stove and let the cooking vessel utilize the heat trapped in the vessel to finish the cooking.

When the heat conduction medium, such as silicon oil is contained in the wall space defined by vertical cylindrical walls of the outer and inner shells, the amount of silicon oil stored in the wall space is approximately 55 to 75%, and more preferably about 65%, by volume.

According to another aspect of the present invention, the cooking vessel further comprises a guard ring disposed in a lower proximity of the wall space around a circumference of the first heat conduction plate. Preferably, the guard ring has an L-shaped cross section. Alternatively, the guard ring has a U-shaped cross section.

According to another aspect of the present invention, the outer edges of the top flange are first welded to the outer edges of the bottom flange, and then interlocked and substantially flattened to form an interlocking joint. Preferably, the outer edges are welded in a seamless matter to prevent water from entering into the inner space formed in between the inner and outer shell.

According to another aspect of the present invention, the outer edges of the bottom flange is rolled at least one time, at about a 360 degree angle, interlocked with the top flange and substantially flattened to form an interlocking joint.

According to another aspect of the present invention, a pressure control element is installed on the outer shell. Preferably, a pressure relief valve is installed near one of the handles.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

Figure 1:
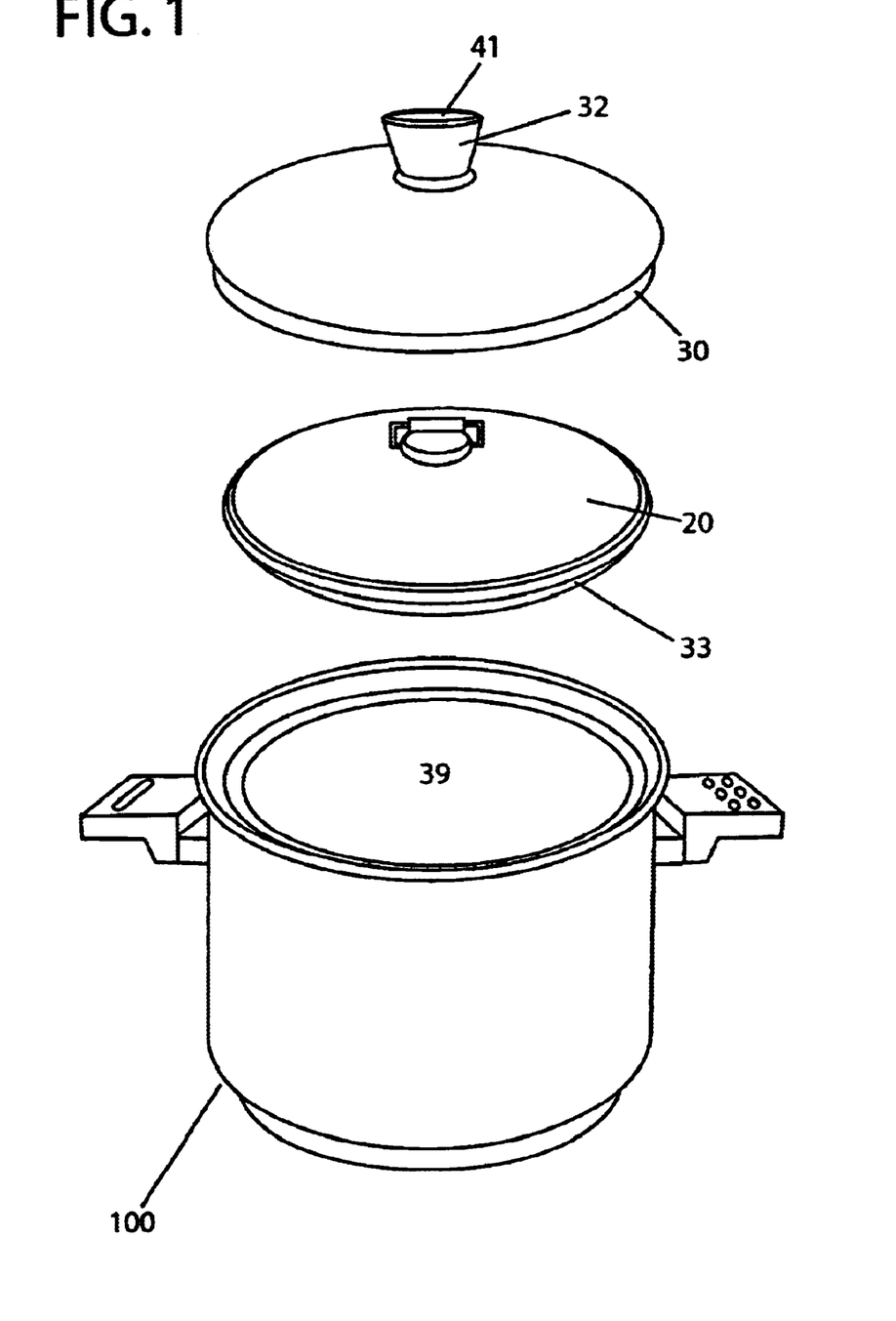
FIG. 1 is a perspective view of the cooking vessel according to the present invention.

FIG. 1 is a perspective view of the cooking vessel 100 according to a preferred embodiment of the present invention. The cooking vessel 100 generally comprises an open region 10 for receiving and cooking food contained therein, an inner lid 20 for substantially covering the vessel 10 and a thermal insulating cover 30 disposed above the inner lid 20 and covering the open region 10 of the cooking vessel 100.

Figure 2:
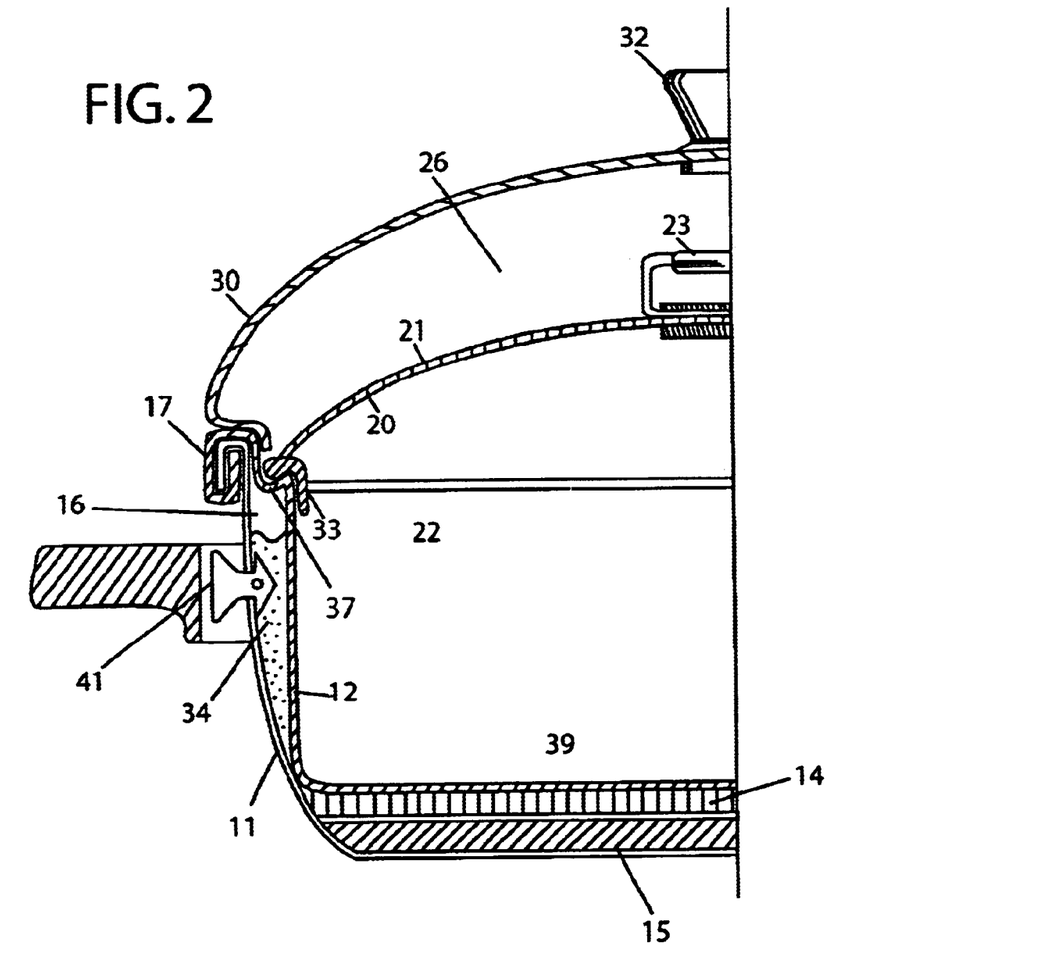
FIG. 2 is a cross-sectional view of a first embodiment of the cooking vessel according to the present invention.

FIG. 2 is a cross-sectional view of the cooking vessel 100 having at least a double-layered structure according to the present invention. According to the preferred embodiment, the inner lid 20 is constructed with a dome-shaped disk 21 of which edge is surrounded by a safety ring 22 preferably made of stainless steel or other suitable materials. The safety ring 22 is attached to the edges of the disk 21, thereby preventing damages to the disk 21. Additionally, an inner lid flange 33 that slides into an open region of an inner shell is formed on the safety ring. However, the inner lid 20 may be used without the ring 22. Preferably, the disk 21 is made to form a slight convexed surface with respect to the vessel 10 of the cookware.

The disk 21 of the inner lid 20 is preferably made of tempered glass of approximately 4 mm thick. Alternatively, the disk 21 may be made of stainless steel, aluminum, aluminum alloy or other suitable materials known to one of ordinary skill in the art.

A handle 23 is attached to the center of the dome-shaped disk 21 by, for example, piercing the central portion of the disk 21. Alternatively, the handle 23 may be affixed to the disk 21 by using adhesives or other fasteners.

The thermal insulating cover 30 is preferably made of a stainless steel plate being about 0.5 to 0.7 mm thick, and preferably about 0.6 mm thick, and has a dome like figure. The insulating cover 30 and the inner lid 20 form a horizontal air gap 26 which acts as an insulating layer to trap and hold heated air therein. As a result, once the heat source is removed from underneath the cooking vessel 100, the air gap 26 and the inner space 16 filled with a heat conduction medium 34 insulate the inner shell 12 from outside and reduce heat loss, thus keeping the food contained in the inner shell 12 warm for a long period of time. More importantly, the structure of the present invention allows the food to be cooked even after removing the cooking vessel from the heat source.

Alternative to a single sheet structure, the cover 30 may comprise a plurality of layers of stainless steel and/or aluminum for increased durability and preservation of heat. In the thermal insulating cover 30, a knob 32 is attached to the center of the thermal insulating cover 30. In the present invention, the knob 32 may include a built-in temperature gauge for measuring the inside temperature of the cookware. The temperature gauge provides the user with information as to when it is time to remove the cooking vessel 100 from the heat source once a desired temperature has been reached.

The cooking vessel 100 according to the present invention includes an outer shell 11 and an inner shell 12 disposed adjacent the outer shell. Edges or flanges of the outer and inner shells are jointly curled and substantially flattened to form an interlocking joint 17.

As a result, an inner space 16 filled with a heat conduction medium 34 is provided between the outer and inner shells 11 and 12. The inner space as well as the heat conduction medium 34 is not in fluid communication with outside air.

In a first embodiment the present invention, the inner space 16 filled with ambient air during the manufacturing process. In such embodiment, air serves as the primary heat conduction medium 34.

In the preferred embodiment, the distance between the outer and inner shells 11 and 12 are approximately 15 to 25 mm, and preferably about 20 mm. Preferably, the outer and inner shells 11 and 12 are made of such materials as AIS1304 stainless steel that has a thickness of about 0.6 mm. Alternatively, instead of using a single-layered stainless steel, a multiple-layered composite materials may be used. Typically, three or more layered stainless steel or combination of stainless copper and steel are preferred.

In another embodiment of the cooking vessel 100, the inner space 16 is at least partially filled with silicon oil up to 55 to 90% by volume. Preferably, the silicon oil is filled up to about 65% of the inner space 16 to accommodate for increased pressure in the inner space 16. For example, while cooking, the pressure of the inner space 16 varies from 200 mmAG to 600 mmAG due to expansion of the silicon oil.

Referring to FIG. 2, there is provided a heat conduction plate 14 placed between the outer and inner shells 11 and 12. The first heat conduction plate 14 is preferably made of an aluminum disk, copper or other suitable materials known to one of ordinary skill in the art. The heat conduction plate 14 is preferably affixed to the inner bottom surface of the outer shell. The heat conduction plate 14 is about 1.5 to 2.5 mm thick, and preferably about 2 mm thick. To provide speedy transmission of heat to the food contained in the cooking vessel 10, the heat conduction plate 14 also makes contact with the outer bottom surface of the inner shell 12. Due to the presence of the heat conduction plate 14, there is no inner space 16 between the bottom of the inner shell 12 and that of the outer shell 11; alternatively, a heat conductive plate 14 having a fluid path is placed between the outer and inner shells 11 and 12.

In the preferred embodiment, a heat transfer plate 15 is disposed below the bottom surface of the outer shell 11 preferably below the heat conduction plate 14. Similar to the heat conduction plate, the heat transfer plate 15 is preferably made of an aluminum disk or other suitable materials known to one of ordinary skill in the art. The heat transfer plate 15 is about 2 to 4 mm thick, and preferably about 3 mm thick. The heat transfer plate 15 is securely affixed to the bottom of the outer shell 11 by brazing or other suitable method known to one of ordinary skill in the art. Preferably, the heat transfer plate is secured to the outer bottom surface of the outer shell 11 by bonding. More preferably, the base is bonded by high-impact.

Alternatively, if a braising or other similar method secures the heat transfer plate, a support cover covers the second heat conduction plate 15. The support cover is attached to an outer bottom surface of the outer shell 11 fully surrounding and in contact with the second heat conduction plate 15. The support cover is preferably made of the same material as that of the vessel 10 of the cooking vessel 100. In particular, the support cover is made of AIS1304 stainless steel that has a thickness of about 0.5 mm. In the vessel, the heat conduction plate 14, the bottom wall of the outer shell 11, the heat transfer plate 15 and the support cover are in thermal communication with each other.

In the embodiment where the primary heat conduction medium 34 is air, the heat transfer plate 15 and the heat conduction plate 14 also serve to heat the inner space 16 of the cooking vessel 100. Although most of the heat transmitted to the bottom of the outer shell 11 is conducted to the heat conduction plate 14, the rest of the heat are transferred to the side walls of the outer and inner shells 11 and 12, respectively. Then, the temperature of the air in the inner space 16 is gradually increased and the heat energy of the air is transmitted to the inner shell 12 and spread out throughout the entire wall of the inner shell 12. Therefore, the temperature along the inner shell 12 is substantially constant at any region thereof. In other words, the temperature of the bottom of the inner shell 12 is about the same as that of the cylindrical wall.

The presence of air in the inner space 16 delays heat transfer between the sides of the outer and inner shells 11 and 12 as well as provides even heat distribution as the heat conducted through the outer shell 11 of the cooking vessel 100 primarily is not transferred to the inner shell 12 of the pot but is partially conveyed through the air.

The heat distributed uniformly in the inner shell 12 heats up the contents in the cooking vessel 100. Once heated, the double-layered structure of the cooking vessel 100 according to the present invention maintains the trapped heat, even after the heat source is removed, for a prolonged period. The heat loss through the sidewalls of the inner and outer shells 11 and 12 are slowed due to the presence of air pockets.

Moreover, it is easy to preserve the heat inside the cooking vessel 100 as the lid 20 and the thermal insulating cover 30 stop the heat dissipating upward. The third air pocket 26 formed between the lid 20 and the insulating cover 30 traps heat therein and holds the temperature for an extended period of time.

Accordingly, the present invention prevents the food from being burnt or being partially heated, since the flame of heating source is not directed to the inner shell 12 and heat is not focused in any one region. In addition, the air stored in the inner space 16 acts as an insulator. Therefore, the food stays hotter for a longer period of time. Moreover, heat efficiency of the cooking vessel is improved.

In the first embodiment of the present invention, the inner rim 37 is shaped in a groove-like manner to fit the ring 22 attached to the outer edges of the disk 21 and to trap moisture. When moisture evaporates from cooking, the groove of the inner rim 37 collects a pocket of moisture. The collected moisture acts as a seal, preventing additional moisture from leaving the open region of the inner shell 39 where the food is being cooked.

Figure 3:
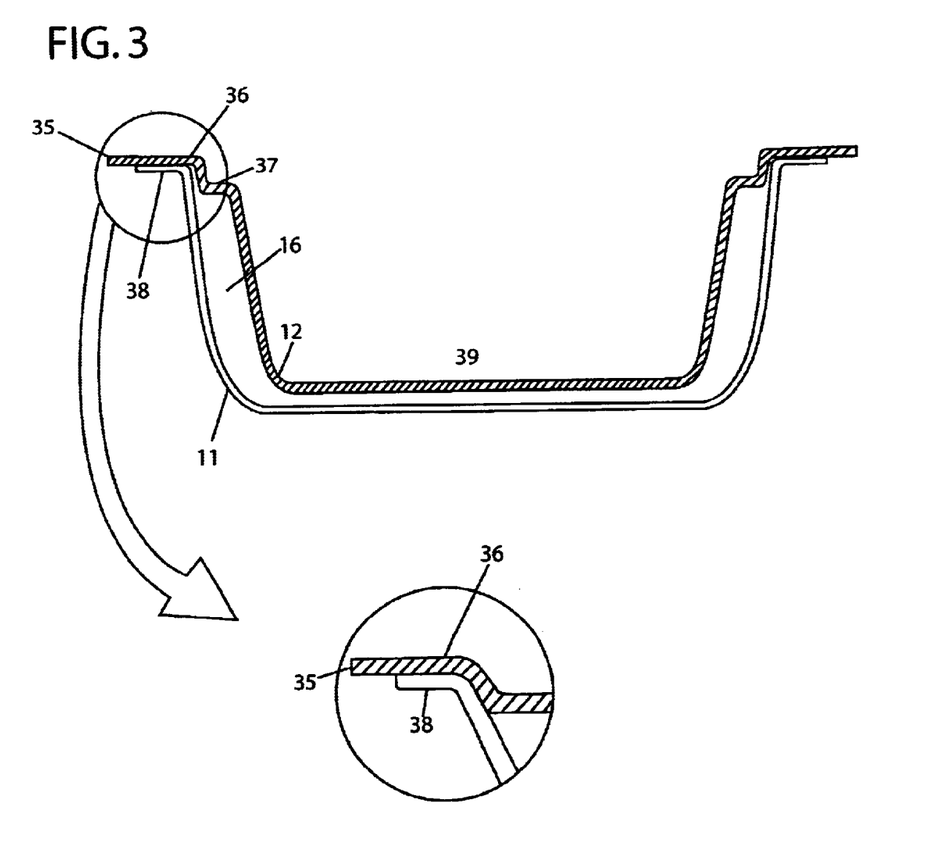
FIG. 3 is a cross-sectional view of a second embodiment of the cooking according to the present invention.

Referring to FIG. 3, first, an inner shell 12 and an outer shell 11 which are preferably made of stainless steel having a predetermined strength are prepared so that the inner shell 12 is placed in an opening region of the outer shell. A heat conduction medium 34, such as silicon oil, is then put into the outer shell 11. Then, the inner shell 12 is placed therein to fill up the space between the outer and inner shells 11 and 12 with the heat conduction medium 34 occupying up to 65% by volume of the space 16. If the cooking vessel 100 does not utilize silicon oil as its primary heat conduction medium 34, then the inner shell is simply placed inside the outer shell 11 for further processing.

Additionally, a inner portion of the top flange 35 forms an inner rim 37 and an outer portion of forms an outer rim 37.

The inner and outer shells 12 and 11, when overlapped, are constructed and designed to provide a vertical and bottom space. The vertical and bottom space are collectively referred to in this specification as the inner space 16. Initially, the top flange 36 of the inner shell 12 and bottom flange 38 of the outer shell 11 are made to assist the downward curling of the edges; therefore, the top flange 35 of the inner of the inner shell 12 extends farther out than that of the bottom flange 38 of the outer shell 11, as shown in FIG. 3. Alternatively, if the upward curling is desired, the bottom flange 38 of the outer shell 11 extends farther than the top flange 35 of the inner shell 12.

Figure 4:
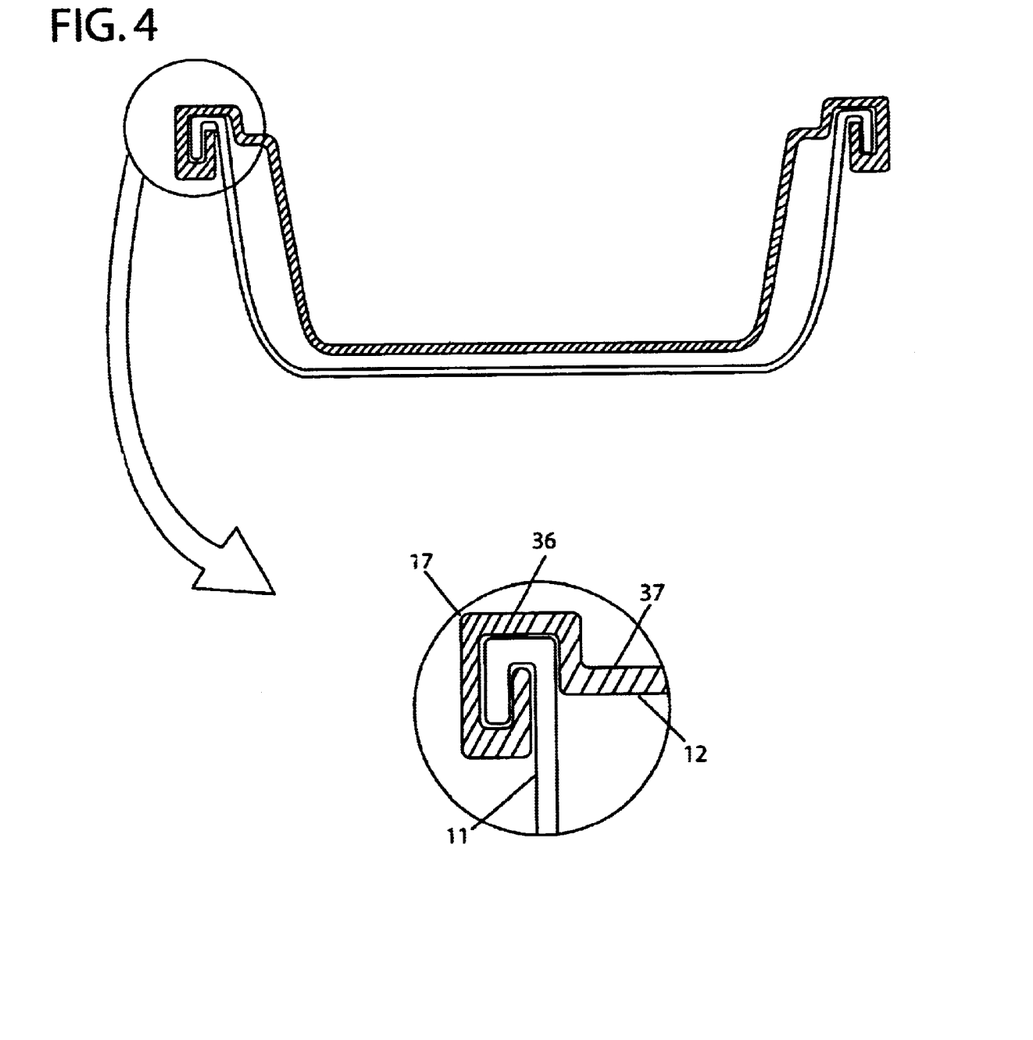
FIG. 4 illustrates an enlarged cross-sectional view of the interlocking joint according to the second embodiment of the present invention.

Referring to FIG. 4, the outer edges of a top flange 35 is interlocked with the outer edges of a bottom flange 38 and substantially flattened to form an interlocking joint 17. In particular, the interlocking joint 17 is formed by jointly curling the longer top flange 35 of the inner shell with the shorter bottom flange 38 of the outer shell, at about the same axis. The top flange 35 is rolled at about 360 degrees one time, about the same axis, and the bottom flange 38 is rolled about half as much as the top flange 35, both flanges forming a hook-like shape and interlocked with one another. The two flanges are then substantially flattened together to form an interlocking joint 17. The interlocking joint 17 prevents the heat conduction medium 34 in the inner space 16 from escaping even when the cooking vessel 100 is subjected to intense heat that causes high pressure in the inner space 16. More importantly, when the two flanges are formed into an interlocking joint 17, it prevents water from seeping into the inner space 16; therefore, substantially reducing the risk of explosion.

To further reduce the risk of explosion, in the first embodiment of the present invention as shown in FIG. 2 a pressure control element 41 is installed on the outer wall 11. Preferably, the pressure control element 41 is installed near one of it handle.

Figure 5:
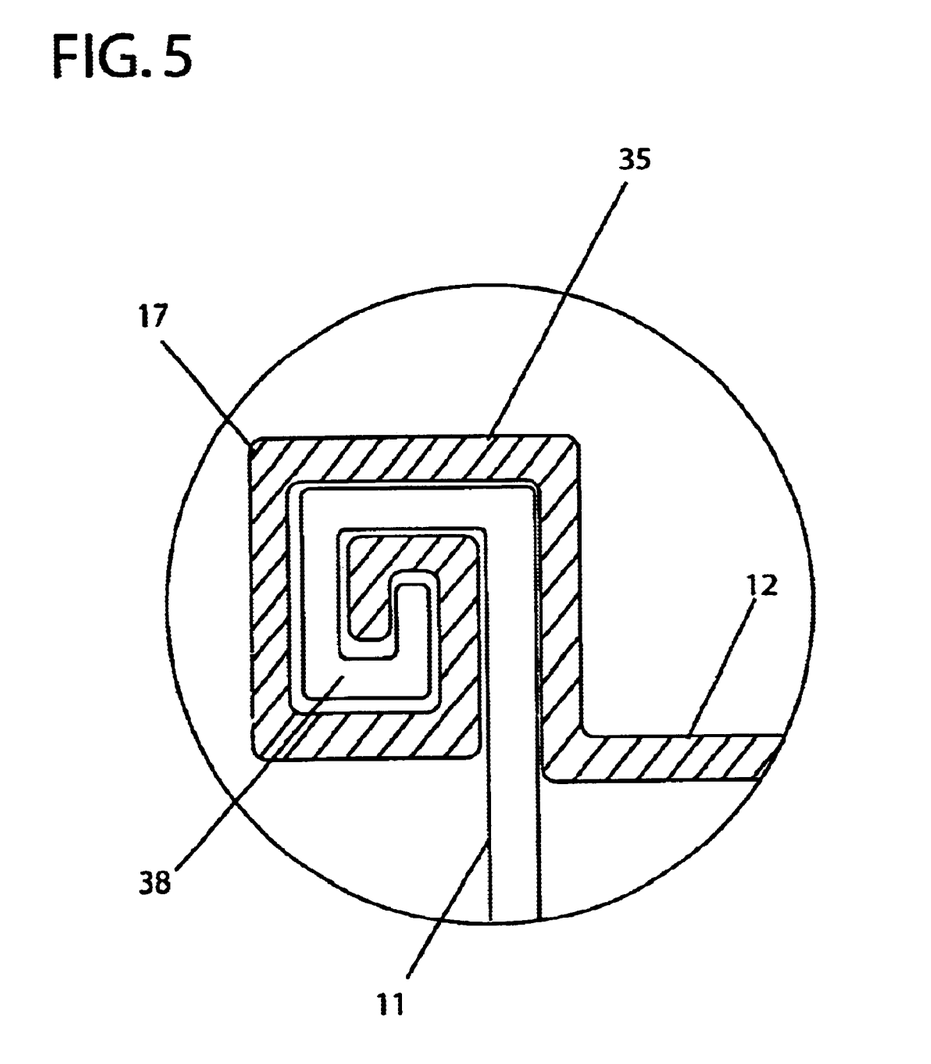
FIG. 5 is illustrates an enlarged cross-sectional view of the interlocking joint according to the third embodiment of the cooking vessel according to the present invention.

FIG. 5 illustrates an enlarged cross-sectional view of the interlocking joint 17 according to the third embodiment of the cooking vessel according to the present invention. In this embodiment, the bottom flange 38 is rolled about one time; the top flange is rolled one and a half time, at about a 360-degree angle, and substantially flattened to form an interlocking joint 17. The additional fold is another means of sealing the inner space 16.

Figure 6:
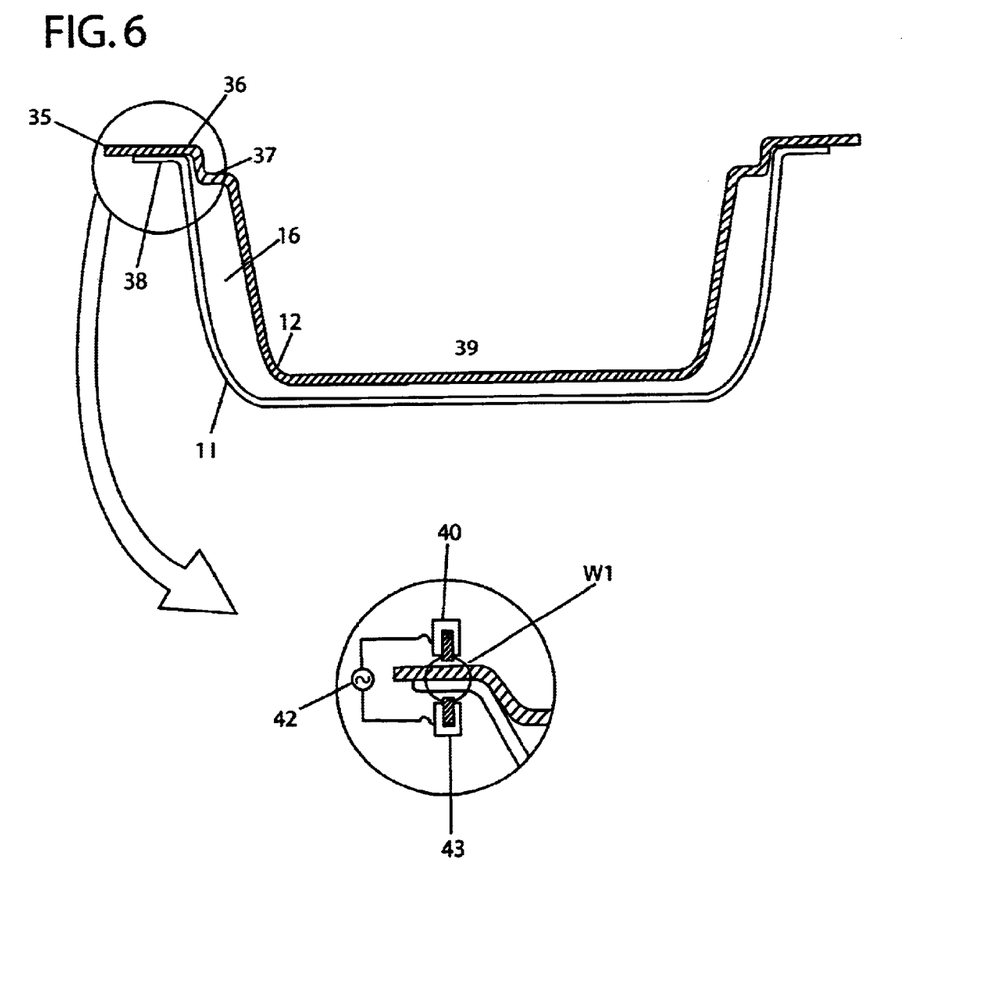
FIG. 6 illustrates the process of welding the top flange of the inner shell to the bottom flange of the outer shell.

FIG. 6 illustrates the process of welding the top flange of the inner shell to the bottom flange of the outer shell.

To prevent the passage of fluid in and out of the inner space and to prevent the buildup of pressure, the flanges of the cooking vessel are electrically welded at a welding point W1. The top flange 35 and the bottom flange 38 are placed between an upper electrode pole 40 and a lower electrode pole 43 of an electric welding machine 42. The cooking vessel 100 is then rotated with respect to the upper electrode pole 40 and the lower electrode pole 43.

Alternatively, another way of seamlessly welding the top flange 35 to the bottom flange 38 is by first embossing a surrounding edge of the top flange 35 to form a protrusion of a predetermined height and utilizing an electric pole and electric plate style welding machine.

Figure 7:
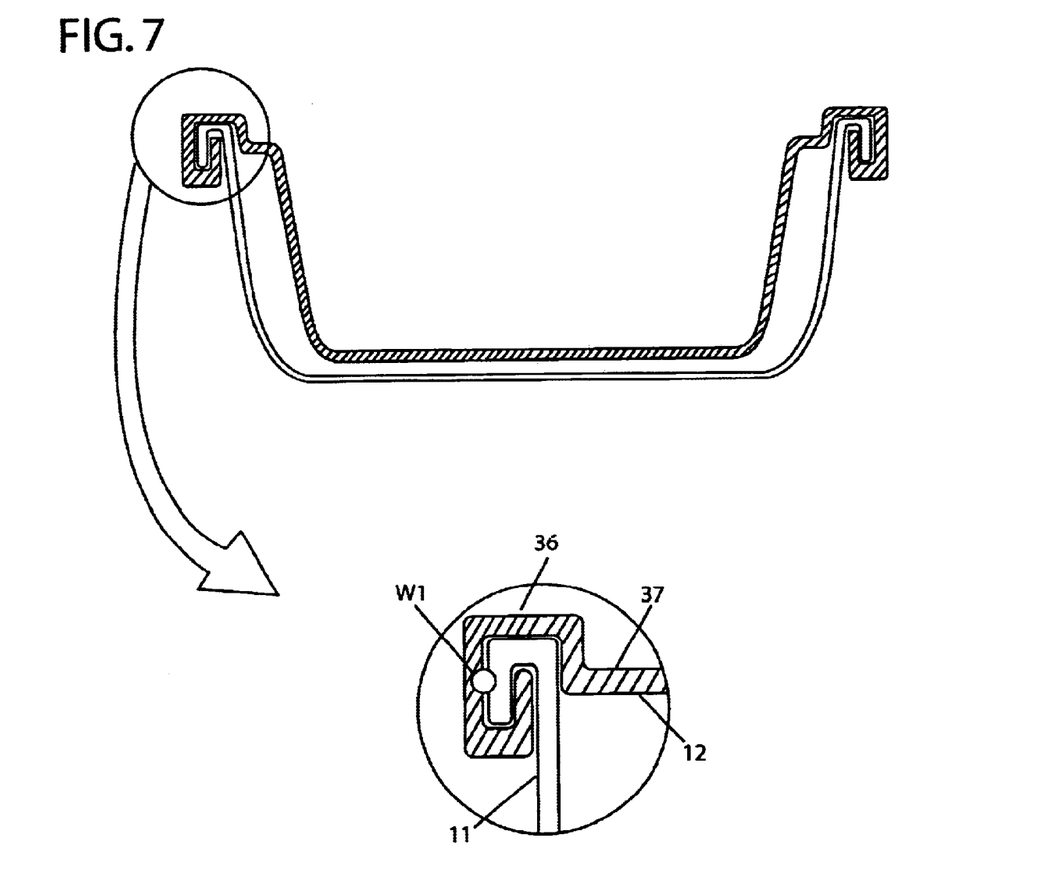
FIG. 7 is illustrates an enlarged cross-sectional view of the interlocking joint and the welding point according to the fourth embodiment of the cooking vessel according to the present invention.

FIG. 7 is illustrates an enlarged cross-sectional view of the interlocking joint 17 and the welding point W1 according to the fourth embodiment of the cooking vessel 100 according to the present invention. The top flange 35 is seamlessly welded to the bottom flange 38, rolled at about the same degree as the first embodiment and substantially flattened to form an interlocking joint 17.

It will be apparent to those skilled in the art that various modifications and variations can be made in the present invention without departing from the spirit or scope of the inventions. Thus, it is intended that the present invention cover the modifications and variations of this invention provided they come within the scope of the appended claims and equivalents.

What is claimed is:

1. A multilayered cooking vessel comprising:
    an inner shell having an open region having a bottom surface which extends upwardly to terminate at a top flange, a portion of the top flange forming an inner rim and an outer rim, the inner rim having a radius less than the radius of the outer rim, the outer rim formed substantially above the inner rim;
    an outer shell having an open region having a bottom surface which extends upwardly to terminate at an outwardly projecting bottom flange, the bottom flange having a length less than the length of the top flange;
    an inner space formed in an area between the inner shell and the outer shell and at least partially contains a heat conduction medium, the inner space formed by disposing the inner shell into the open region of the outer shell;
    an inner lid adapted to cover the open region of the inner shell and a portion of the inner rim; and
    an outer lid adapted to cover the cooking vessel and a portion of the outer rim, wherein outer edges of the top flange is interlocked to outer edges of the bottom flange and substantially flattened to hermetically seal the inner space.

2. The cooking vessel of claim 1, wherein the heat conduction medium is at least partially composed of air.

3. The cooking vessel of claim 1, wherein the heat conduction medium is at least partially composed of silicon oil.

4. The cooking vessel of claim 1, wherein the inner lid comprises a disk having a diameter sufficiently large to cover the open region of the inner shell; and a ring having a downwardly projecting inner lid flange coupled to the disk and circumferentially covering outer edges of the disk.

5. The cooking vessel of claim 4, wherein the disk is composed of glass.

6. The cooking vessel of claim 5, wherein the inner rim is shaped in groove-like manner.

7. The cooking vessel of claim 1, further comprising a heat transfer plate affixed to and in contact with an outer bottom surface of the outer shell.

8. The cooking vessel of claim 7, wherein the heats transfer plate is bonded to the outer bottom surface of the outer shell.

9. The cooking vessel of claim 1, wherein outer edges of the top flange is welded to outer edges of the bottom flange, rolled and substantially flattened to form an interlocking joint.

10. The cooking vessel of claim 1, wherein outer edges of the bottom flange is rolled at least one time, at about a 360 degree angle, interlocked with the top flange and substantially flattened to form an interlocking joint.

11. The cooking vessel of claim 1, further comprising a means of gauging temperature is installed on the outer lid.

12. The cooking vessel of claim 1 wherein a pressure control element is installed on the outer shell.

13. The cooking vessel of claim 1, further comprising a heat conductive plate being in contact with both an inner surface of the outer shell and an outer surface of the inner shell.

14. The cooking vessel of claim 13, wherein a flow path of the heat conduction medium is formed on the second heat conduction plate.

* * * * *